(12) United States Patent
Barth et al.

(10) Patent No.: US 12,388,913 B2
(45) Date of Patent: Aug. 12, 2025

(54) CONTROLLER-TO-CONTROLLER INTERFACE FOR MULTI-LAYER NETWORK ABSTRACTION

(71) Applicant: Juniper Networks, Inc., Sunnyvale, CA (US)

(72) Inventors: Jonathan Colby Barth, Collegeville, PA (US); Sudhir Cheruathur, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/164,043

(22) Filed: Feb. 1, 2021

(65) Prior Publication Data
US 2021/0211358 A1 Jul. 8, 2021

Related U.S. Application Data

(63) Continuation of application No. 14/515,074, filed on Oct. 15, 2014, now abandoned.

(51) Int. Cl.
*H04L 69/08* (2022.01)
*H04L 41/12* (2022.01)
(Continued)

(52) U.S. Cl.
CPC .............. *H04L 69/08* (2013.01); *H04L 41/12* (2013.01); *H04L 43/06* (2013.01); *H04L 69/18* (2013.01); *H04L 69/322* (2013.01); *H04L 49/602* (2013.01)

(58) Field of Classification Search
CPC .............. H04J 14/0252; H04J 14/0256; H04J 14/0267; H04J 14/0275; H04L 69/08;
(Continued)

(56) References Cited

U.S. PATENT DOCUMENTS 6,549,513 B1 * 4/2003 Chao ...................... H04L 45/00
370/227
6,701,088 B1 * 3/2004 Watanabe .......... H04Q 11/0005
398/79
(Continued)

FOREIGN PATENT DOCUMENTS

CN 1638385 A 7/2005
CN 103460653 A 12/2013
(Continued)

OTHER PUBLICATIONS

Extended European Search Report for European Application No. 15189190.0, mailed Mar. 11, 2016, 8 pages.
(Continued)

*Primary Examiner* — Sai Aung
(74) *Attorney, Agent, or Firm* — Cooley LLP

(57) ABSTRACT

A controller at an IP (e.g., client) layer in a multi-layer network can request a network topology map from another controller at an optical (e.g., server) layer in the multi-layer network. The controller at the optical layer of the network can use a layer mapping function and common attributes between the formats used to describe the network topology map at the two layers to generate a common layer abstraction model representing the network topology map stored at the controller at the optical layer of the network. A controller-to-controller interface can translate and/or send the common layer abstraction model to the controller at the IP layer for processing data on the network.

19 Claims, 6 Drawing Sheets

(51) Int. Cl.
*H04L 43/06* (2022.01)
*H04L 69/18* (2022.01)
*H04L 69/32* (2022.01)
*H04L 69/322* (2022.01)
*H04L 49/60* (2022.01)

(58) Field of Classification Search
CPC ..... H04L 69/18; H04L 69/16; H04L 12/2885; H04Q 11/0071; H04Q 2011/0073; H04Q 2011/0083; H04Q 3/0025; H04Q 11/0066; H04Q 11/0067
See application file for complete search history.

(56) References Cited

U.S. PATENT DOCUMENTS

| | | | | |
|---|---|---|---|---|
| 6,731,876 | B1* | 5/2004 | Okamoto | H04J 14/0227 |
| | | | | 370/466 |
| 7,483,446 | B2 | 1/2009 | Okamoto et al. | |
| 8,433,195 | B2* | 4/2013 | Biegert | H04J 14/0247 |
| | | | | 398/72 |
| 9,167,309 | B2* | 10/2015 | Lee | H04L 12/2801 |
| 2002/0191626 | A1* | 12/2002 | Moriwaki | H04L 49/352 |
| | | | | 370/413 |
| 2004/0076160 | A1* | 4/2004 | Phaltankar | H04L 45/586 |
| | | | | 370/395.1 |
| 2006/0056615 | A1* | 3/2006 | Rao | H04Q 3/0025 |
| | | | | 379/229 |
| 2007/0140271 | A1* | 6/2007 | Amante | H04L 45/60 |
| | | | | 370/401 |
| 2007/0280265 | A1* | 12/2007 | Gerstel | H04L 43/0823 |
| | | | | 370/395.52 |
| 2008/0084898 | A1* | 4/2008 | Miyaho | H04L 47/10 |
| | | | | 370/498 |
| 2008/0317039 | A1* | 12/2008 | Satterlee | H04L 12/66 |
| | | | | 370/395.5 |
| 2009/0034973 | A1* | 2/2009 | Sakamoto | H04Q 11/0067 |
| | | | | 398/58 |
| 2011/0235635 | A1* | 9/2011 | Yadav | H04Q 11/0067 |
| | | | | 398/58 |
| 2012/0221624 | A1* | 8/2012 | Gerstel | H04L 45/02 |
| | | | | 709/203 |
| 2013/0071116 | A1* | 3/2013 | Ong | H04L 45/04 |
| | | | | 398/45 |
| 2013/0114409 | A1* | 5/2013 | Iovanna | H04L 47/70 |
| | | | | 370/235 |
| 2014/0040476 | A1* | 2/2014 | Ishida | H04L 61/103 |
| | | | | 709/226 |
| 2014/0233946 | A1* | 8/2014 | Gerstel | H04B 10/27 |
| | | | | 398/45 |
| 2014/0258486 | A1* | 9/2014 | Filsfils | H04L 45/22 |
| | | | | 709/223 |
| 2014/0270771 | A1* | 9/2014 | Filsfils | H04Q 11/0066 |
| | | | | 398/66 |
| 2015/0023663 | A1* | 1/2015 | Gerstel | H04Q 11/0005 |
| | | | | 398/49 |
| 2016/0112271 | A1 | 4/2016 | Barth et al. | |
| 2018/0262422 | A1* | 9/2018 | Gerstel | H04L 45/28 |
| 2021/0105173 | A1* | 4/2021 | Gerstel | H04L 41/065 |
| 2021/0168020 | A1* | 6/2021 | Gerstel | H04L 47/822 |

FOREIGN PATENT DOCUMENTS

CN 103873277 A 6/2014
WO WO 2014/003700 1/2014

OTHER PUBLICATIONS

Extended European Search Report for European Application No. 18162903.1, mailed May 24, 2018, 8 pages.
Office Action for European Application No. 18162903.1, mailed Jun. 15, 2020, 5 pages.
First Office Action for Chinese Application No. 201510663140.1, mailed Jun. 27, 2018, 10 pages.
Rajagopalan, C. J. et al., "IP Over Optical Networks: A Framework," The Internet Society, Mar. 2004, 49 pages.
First Office Action for Chinese Application No. 201910448442.5, mailed Apr. 2, 2021, 8 pages.
Extended European Search Report for European Application No. 22162323.4, mailed Jun. 14, 2022, 12 pages.

* cited by examiner

CONTROLLER-TO-CONTROLLER INTERFACE FOR MULTI-LAYER NETWORK ABSTRACTION

CROSS-REFERENCE TO RELATED APPLICATION

This application is a continuation of U.S. patent application Ser. No. 14/515,074, filed Oct. 15, 2014, and entitled "Controller-To-Controller Interface for Multi-Layer Network Abstraction", the disclosure of which is incorporated herein by reference in its entirety.

BACKGROUND

Some embodiments described herein relate generally to network systems, and more particularly, to systems and methods relating to abstracting layers of a multi-layer network.

Multi-layer networks have been widely used as a way of organizing network resources in a number of different ways to describe different network functionality and/or purposes. Each layer (also described herein as a domain) in a network can use different foundational technologies, which may not be inherently compatible with one another. For example optical network layers and IP network layers often use different communication protocols, represent links between network devices differently, are controlled differently, and/or the like.

Known networks have historically employed shared cross-layer formats for both optical network layers and IP network layers to represent links between network devices and/or like network attributes. For example, Generalized Multi-Protocol Label Switching (GMPLS) employs a single common control-plane representation for multiple layers of a multi-layer network. It also defines protocols such as Link Management Protocol (LMP), Resource Reservation Protocol (RSVP), and Open Shortest Path First (OSPF) to handle communications within and between network layers. This common representation for blending characteristics between the network layers, however, is often lacking in layer-specific optimizations that allow for faster processing of network functions within a particular layer. Additionally, a single common representation may prevent each layer from being able to evolve independently from other layers in the network, e.g., by requiring that each layer develop according to common constraints defined by the common representation.

Accordingly, a need exists for systems and methods that can allow network layers to communicate and share information with each other, while allowing for the network layers to continue to use protocols, network representation formats, and/or the like that are more specifically suited for the particular network layer.

SUMMARY

In some implementations, network layers can use the combination of a controller-to-controller interface (CCI) and a layer mapping function (LMF) module in tandem with various network inputs, to send, receive, and translate various communications between network layers. For example, the CCI and LMF at a first network controller at a first network layer can be used to translate network topology maps and/or like domain link representations into a common link abstraction model (CAM). The CAM can be interpreted by any of the network layers via their own CCI, and/or can be used to translate ingoing and/or outgoing communications into a format that can be interpreted by the recipient of the data.

Some implementations are directed to a system comprising a network entity at a first layer of a multilayer network, the entity at the first layer configured to receive a request for a network topology from a network entity at a second layer of a multilayer network. The network entity can use a layer mapping function module operatively coupled to the network entity at the first layer and configured to generate a translation protocol. The translation protocol is configured to determine common attributes between a first topology format and a second topology format. The network entity at the first layer of the multilayer network is configured to use the translation protocol to convert a topology map in the first topology format into a topology map in a third topology format. A multilayer network translation interface module is configured to use the topology map in the third topology format to generate a topology map in the second topology format. The network entity at the first layer is configured to send the topology map in the second topology format to the network entity at the second layer such that the entity at the second layer determines a path between a first network node and a second network node based on the topology map in the second topology format.

In further implementations, a system comprises a controller at a first layer of a multilayer network including a layer mapping function module. The layer mapping function module is configured to translate a network topology map in a first format and at the first layer of the multilayer network into a second format in response to a request for a network topology from a controller at a second layer. The controller at the first layer can be further configured to provide the network topology map in the second format to a controller-to-controller interface module configured to convert the network topology map to a third format and provide the network topology map in the third format to the controller at the second layer.

In further implementations, a method comprises receiving a signal, at a first controller at a first layer of a multilayer network from a second controller at a second layer in the multilayer network, requesting a network topology map in a second layer topology format. The method includes, in response to the signal, retrieving a network topology map in a first layer topology format at the first controller. The method further comprises translating the network topology map in the first layer topology format into a network topology map in an intermediary topology format using a layer mapping function module at the first controller, and translating the topology map in the intermediary topology format into a topology map in the second layer topology format using a controller-to-controller interface module. Finally, the method further comprises sending the topology map in the second layer topology format to the second controller.

DETAILED DESCRIPTION

Figure 1:
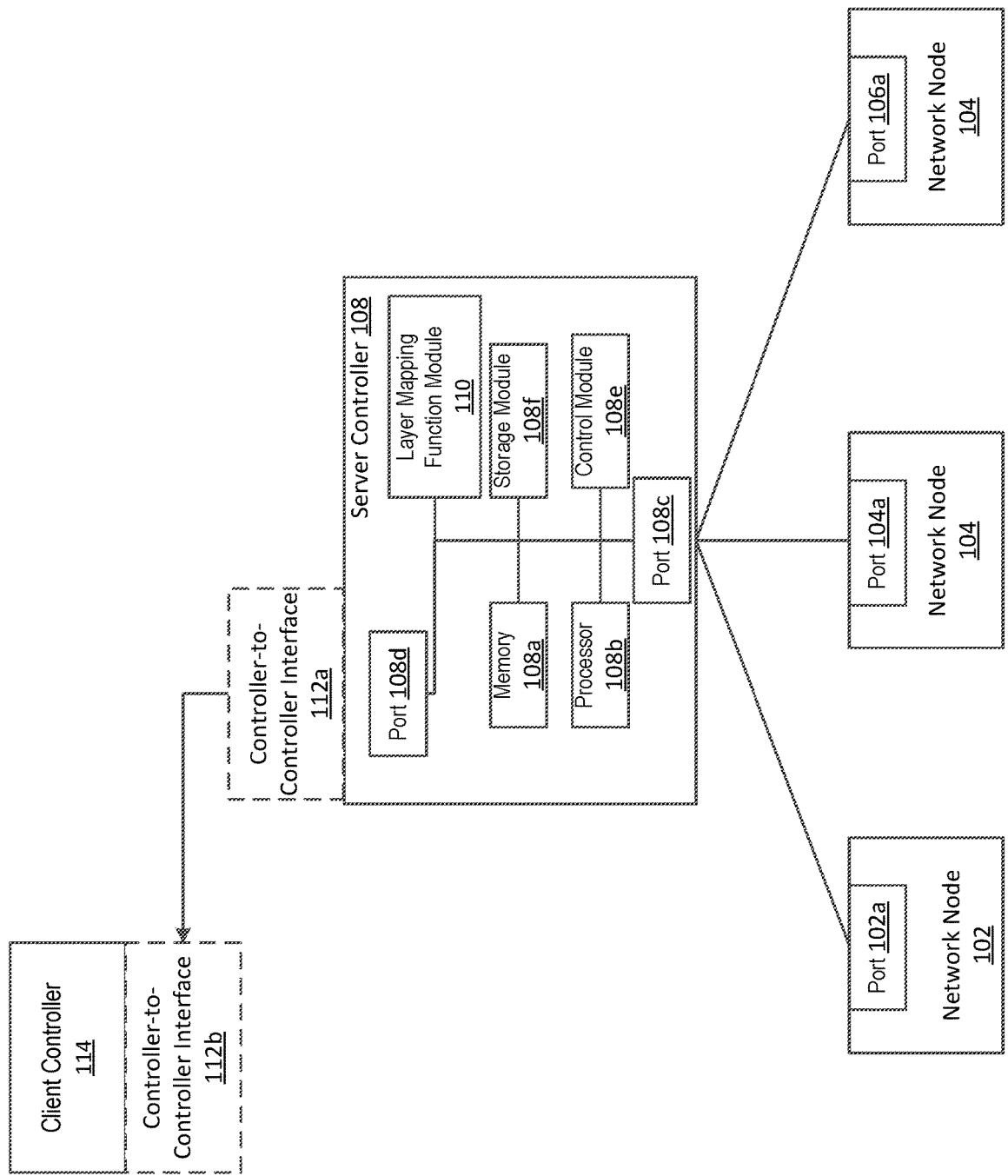
FIG. 1 is a schematic illustration of a network employing a controller-to-controller interface, according to an embodiment.

FIG. 1 is a schematic illustration of a multi-layer network employing a multilayer network translation interface module (e.g., controller-to-controller interface 112a or 112b), according to an embodiment. In some implementations a multi-layer network can include network nodes 102, 104, and 106. Each network node 102, 104, and 106 can be a network device including but not limited to a network switch, a network router, a network storage device, a network access device, and/or a similar network computing device. Each network node can include at least a memory and a processor and/or a set of processors, and can be configured to store processor-executable instructions in the memory to carry out various functions in the network.

In some implementations, network nodes 102, 104, and 106 can be operatively coupled to a network entity, such as a server layer controller 108 (e.g., including but not limited to a data link layer and/or a Layer 2 (L2) controller) situated in the second layer of the multi-layer network. Each of the network nodes 102, 104, and 106 can be operatively coupled to the Server controller 108, for example, via a wired connection between at least one port 108c on the Server controller 108, and ports 102a, 104a, and 106a on the network nodes 102, 104, and 106, respectively. The second layer of the multi-layer network can be, for example, an optical (e.g., server) layer and/or domain, and can use formats such as but not limited to Device Management Interface (DMI) formats to represent the network topology of the network nodes 102, 104, and 106. The Server controller 108 can be a switch device and/or other core server layer device, which can manage incoming and outgoing data in the optical layer of the network, e.g., by managing routing, processing, authenticating, and/or other actions performed on the data in the network. The Server controller 108 can include at least a memory 108a and a processor 108b and/or a set of processors, and can be configured to store processor-executable instructions in the memory, the instructions informing the processor of how to manage the network nodes 102, 104, and 106 and/or how to manage data being passed to and/or from the network nodes 102, 104, and 106. The Server controller can also include a control module 108e for managing control of network operations and/or data (e.g., such as managing processing and encapsulation of data packets sent between network nodes 102, 104, and 106, and/or controlling network nodes 102, 104, and 106's access to data), and a storage module 108f for persistent data storage. While not shown, multiple Server controllers can exist on the optical layer of the network, and can each be operatively coupled to a number of network nodes.

A Layer Mapping Function (LMF) module 110 can be a module operative within the Server controller 108, and can be embodied in hardware (e.g., a modular hardware chip including processing hardware and data storage hardware, the modular hardware chip being operatively coupled to a network controller such as Server controller 108) and/or software (e.g., a computer code module and/or a software object) stored or implemented in hardware. The LMF module 110 can be configured to define the connectivity between network layers and can extract common attributes between various network layers to define a function, model, and/or method of abstracting data (e.g., topology data) from any of the network layers. The LMF module 110 can be configured to provide this function, model, and/or abstraction method to the Server controller 108 to enable the Server controller 108 to define abstractions of data in, for example, an optical layer format (e.g., abstracting network topology representations described in an optical layer format). These abstractions can be translated and/or interpreted by other controllers in other network layers. An example of a LMF module model that describes communication between a server layer node (e.g., a network node on the data link and/or L2 layer) and a client layer controller 114 (e.g., including but not limited to a network layer and/or a Layer 3 (L3) controller) can take a form similar to the following:

1.1.1.1 1.1.1.2
+- - - - - - - - - - - - - -+ +- - - - - - - - - - - - - - - - -+
|IP Node1|<- - - - -LMF- - - - - ->|Optical node|
+- - - - - - - - - - - - - -+ +- - - - - - - - - - - - - - - - -+
Add: 10.1.1.1 10.1.1.2
ID: 12345 54321
100G Ethernet ODU4
NodeID: 1.1.1.1
To: 1.1.1.2, LocalIPaddr: 10.1.1.1, RemoteIPaddr: 10.1.1.2
LocalIfIndex: 12345, RemoteIfIndex: 54321
Metric: 23
Bandwidth: 100 Gbps
Interface Switching Capability:
Local: Ethernet
Remote: Lambda In some implementations, an example of an abstraction may be a common link abstraction model (CAM). A CAM can be a network layer-dependent model and/or representation of network layer data. For example, a CAM derived from a network topology map maintained at an optical layer of the network can specify a manner of describing links between network devices, which can be independent of the structure of the optical network layer and/or other specific constraints and/or properties of the optical network layer. The CAM can then be sent to other controllers in other network layers, e.g., can be sent to a Client controller 114, which can interpret the CAM and generate a network topology map in its own client layer format (e.g., an Internet Protocol (IP) layer format defining IP-specific links and network properties). An example of a CAM description can take a form similar to the following:

+- - - - - - - - - - - - - - - - - - - - - - - -+
|Optical Controller|- - - -CAM- - ->
+- - - - - - - - - - - - - - - - - - - - - - - -+
||
+- - - - - - - - - -DMI- - - - - - - - - - - - - - - - - - - - -
- - - - - - - - - - - - - - - - - - - -+
| | |
1.1.1.2 V 1.1.1.3 V V 1.1.1.4
+- - - - - - - - - - - - - - - -+ +- - - - - - - - - - - - - - - -
-+ +- - - - - - - - - - - - - - - - -+

```
|Optical Node1|<- - - - - - - - - ->|Optical node2|<- - - -
 - - - - - ->| Optical node3|
+- - - - - - - - - - - - - - - - - -+ +- - - - - - - - - - - - - - - - -
 -+ +- - - - - - - - - - - - - - - - - - -+
<- - - - - - - - - - - - - - - - - - - - - - - - - - -link ABC- - - -
 - - - - - - - - - - - - - - - - - - - - ->
```
Add: 10.1.2.1 10.1.2.2
ID: 78901 10987
100G Lambda Lambda NodeID: 1.1.1.2
To: 1.1.1.4, LocalIPaddr: 10.1.2.1, RemoteIPaddr: 10.1.2.2
LocalIfIndex: 78901, RemoteIfIndex: 10987
Metric: 47
Bandwidth: 100 Gbps
Interface Switching Capability:
Local: Lambda
Remote: Lambda
Encoding: ODU4
Attributes:
SRLG: 5
Admin-group: Blue
Protected: False A controller-to-controller interface 112a and 112b can be operatively coupled to the Server controller 110 and the Client controller 114, respectively. The controller-to-controller interfaces 112a-b can be embodied in hardware (e.g., a modular hardware chip including processing hardware and data storage hardware, the modular hardware chip being operatively coupled to a network controller) and/or software (e.g., a computer code module stored or implemented in hardware, firmware, processor-executable instructions stored in memory, and/or the like stored or implemented in hardware). The controller-to-controller interfaces 112a-b can be configured to transfer the defined CAM to another network controller on another network layer, and/or to receive CAMs from other network controllers. The controller-to-controller interfaces 112a-b can also be configured to translate CAMs into formats associated with the particular network layer at which they are received.

For example, the controller-to-controller interface 112a can be configured to send a CAM representing the network topology map (e.g., defined in an optical layer format and maintained by the Server controller 108) to Client controller 114. The controller-to-controller interface 112b can also be configured to receive CAMs, e.g., from the Server controller 108, and translate them into a client layer format (e.g., an IP layer format) for quick processing of the network topology map. In some implementations, controller-to-controller interface 112a may automatically translate a CAM into an client layer format, and send the client-layer-formatted network topology map to Client controller 114, such that Client controller may not need a controller-to-controller interface 112b and/or other techniques for interpreting the CAM. In some implementations, Client controller 114 may be able to interpret the CAM without the use of a controller-to-controller interface 112b to translate the CAM into a client layer format, and may directly receive the CAM for processing. In other words, the functionality of a controller-to-controller interface can be included within a controller, and the controller-to-controller interface 112b and Client controller 114 need not be separate devices.

In some implementations, the LMF module 110 can reside in the controller-to-controller interface 112a instead of the Server controller 108. In such implementations, the LMF module 110 can use a modified communication protocol (e.g., a modified version of LMP) to provide the CAM to the Server controller 108, and/or the like.

Client controller 114 can be a network controller (e.g., a switch device and/or other core client layer device) situated in the third layer of the multi-layer network. The third layer of the multi-layer network can be an IP (e.g., client) layer and/or domain, and can use formats such as but not limited to Link State Database (LSDB) and/or Traffic-Engineering Database (TED) formats in order to represent the network topology of the network nodes 102, 104, and 106. The Client controller 114 can manage incoming and outgoing data in the IP layer of the network, e.g., by managing routing, processing, authenticating, and/or other actions performed on the data in the network. The Client controller 114 can also include at least a memory and a processor and/or a set of processors, and can be configured to store processor-executable instructions in the memory, the instructions informing the processor of how to manage network nodes and/or how to manage data being passed to and/or from the network nodes. Client controller 114 can be operatively connected to a controller-to-controller interface 112b, which can receive and/or translate CAMs received by the Client controller 114 into a client layer (e.g., IP layer) format, e.g., an IP layer network topology map format, and/or the like. In some implementations, Client controller 114 may not be directly coupled to a controller-to-controller interface 112b, and may instead directly receive CAMs and/or IP-layer-formatted network topology map data from the controller-to-controller interface 112a operatively coupled to the Server controller. Although not shown, multiple Client controllers can operate on the IP layer of the network, and can each be operatively coupled to at least one Server controller at the optical layer of the network. Client controller 114 and/or other Client controllers in the network can also be operatively coupled to network nodes 102, 104, and 106, and/or other network nodes in the network.

FIGS. 2-6 provide example implementations of the system described in FIG. 1, it should be understood that the processes and functionality described in FIGS. 2-6 can be implemented using a variety of other network configurations and/or system arrangements, and are not limited to the structure embodied in FIG. 1.

Figure 2:
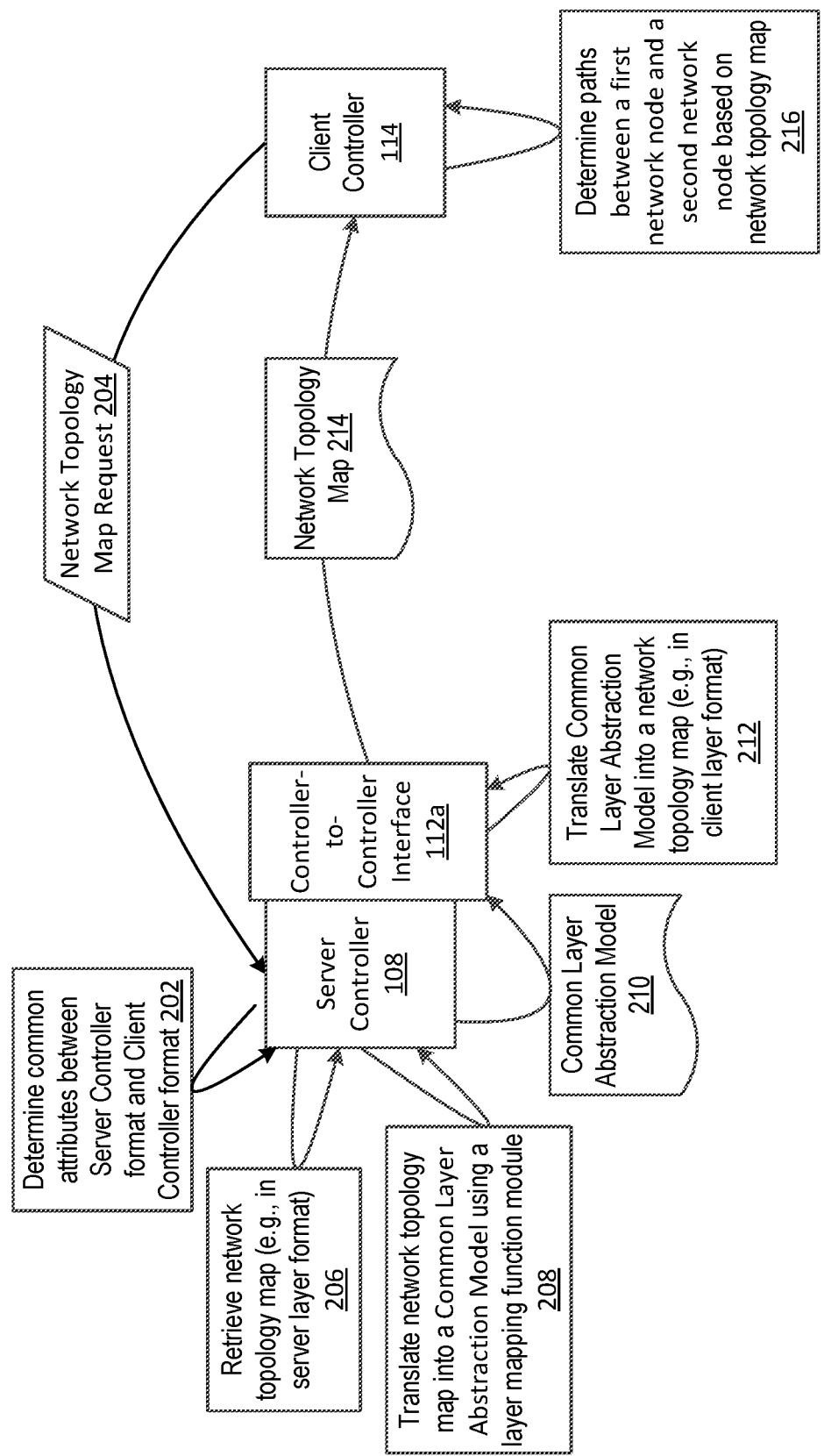
FIG. 2 is a flow diagram of providing a network topology map to a Client controller from a Server controller with a controller-to-controller interface, according to a first embodiment.

FIG. 2 is a flow diagram of providing a network topology map to a Client controller from a Server controller with a controller-to-controller interface 112a, according to an embodiment. In some implementations, the Server controller 108 can, using the LMF module 110 (e.g., shown in FIG. 1), determine common attributes, at 202, between the network topology format used by the optical layer and the Server controller 108, and the network topology format used by the IP layer and the Client controller 114. Determining common attributes can include determining common indicia each layer's format uses to describe a network link in a network topology map, to describe a path between network nodes, and/or the like. In some implementations the LMF module 110 can derive the common attributes based on a comparison of network topology maps in the two layers' formats, based on receiving attributes and/or descriptions of the layers' formats being compared, and/or the like. The LMF module 110 can alternatively receive data indicating the common attributes (e.g., from a network administrator, from data embedded in the LMF module 110, and/or the like) instead of determining the attributes on its own.

The Client controller 114 can also generate and send a network topology map request 204 to the Server controller 108. The network topology map request 204 can request a copy of the network topology map maintained by the Server controller 108. The Client controller 114 can use the network topology map to determine how to route and/or manage data packets in the network, how to link and/or otherwise associate network nodes, how to generate virtual network nodes to fulfill various network functions, and/or the like. In some implementations, the network topology map stored at the Server controller 108 and retrieved, at 206, as a result of the request may not be in a format readable by the Client controller 114 (e.g., the network topology map can be in an optical layer format rather than an IP layer format, and/or the like). Storing the network topology map in an optical layer format can allow for faster processing of network information, as it can allow the optical layer to process data using a network topology map in a format that the optical layer can easily interpret, and can allow the optical layer to use optimizations inherent in the optical layer format to process the data. Thus, to provide the Client controller 114 with a network topology map representation that it can process, the Server controller 108 can use the LMF module 110 to translate, at 208, the network topology map into a CAM 210. The LMF module can, for example, generate, as the CAM 210, a representation of the network topology map that uses the attributes common to the two layers' formats to describe the network links and communications.

Translating the network topology map into a CAM when the network topology map is requested by a controller at another layer allows the optical layer controllers (e.g., the Server controller 108) to maintain the network topology map in a format optimized and/or streamlined for the functionality of the optical layer. Maintaining the network topology map in the optical layer format also allows the optical layer to include attributes and/or information specific to the nature of the optical layer. Translating the CAM also allows the Server controller 108 to still communicate the current topology of the network to other layers. Storing the CAM itself and/or a representation in a single common format would not allow for the same efficiency and/or ability to fully describe the network topology at the optical layer.

In some implementations, the CAM 210 generated by the LMF module 110 can be sent to a controller-to-controller interface 112a, which can be operatively coupled to the Server controller 108. The controller-to-controller interface 112a can be configured to translate, at 212, the CAM into a network topology map 214 in the IP layer format. The controller-to-controller interface 112a can also provide the network topology map 214 to the Client controller 114 via a signal to the Client controller 114, which includes a representation of the network topology map 214. The Client controller 114 can then determine paths (e.g., optimized paths, shortest paths, fastest paths, and/or the like) between a first network node in the network and a second network node 216 in the network based on the network topology map.

In some implementations, the CAM 210 can also be sent directly to the Client controller 114, which can be configured to interpret the CAM 210 directly, and/or may be operatively coupled to a second controller-to-controller interface 112b (e.g., see FIGS. 3-4), which is configured to translate the CAM into an IP layer format.

Figure 3:
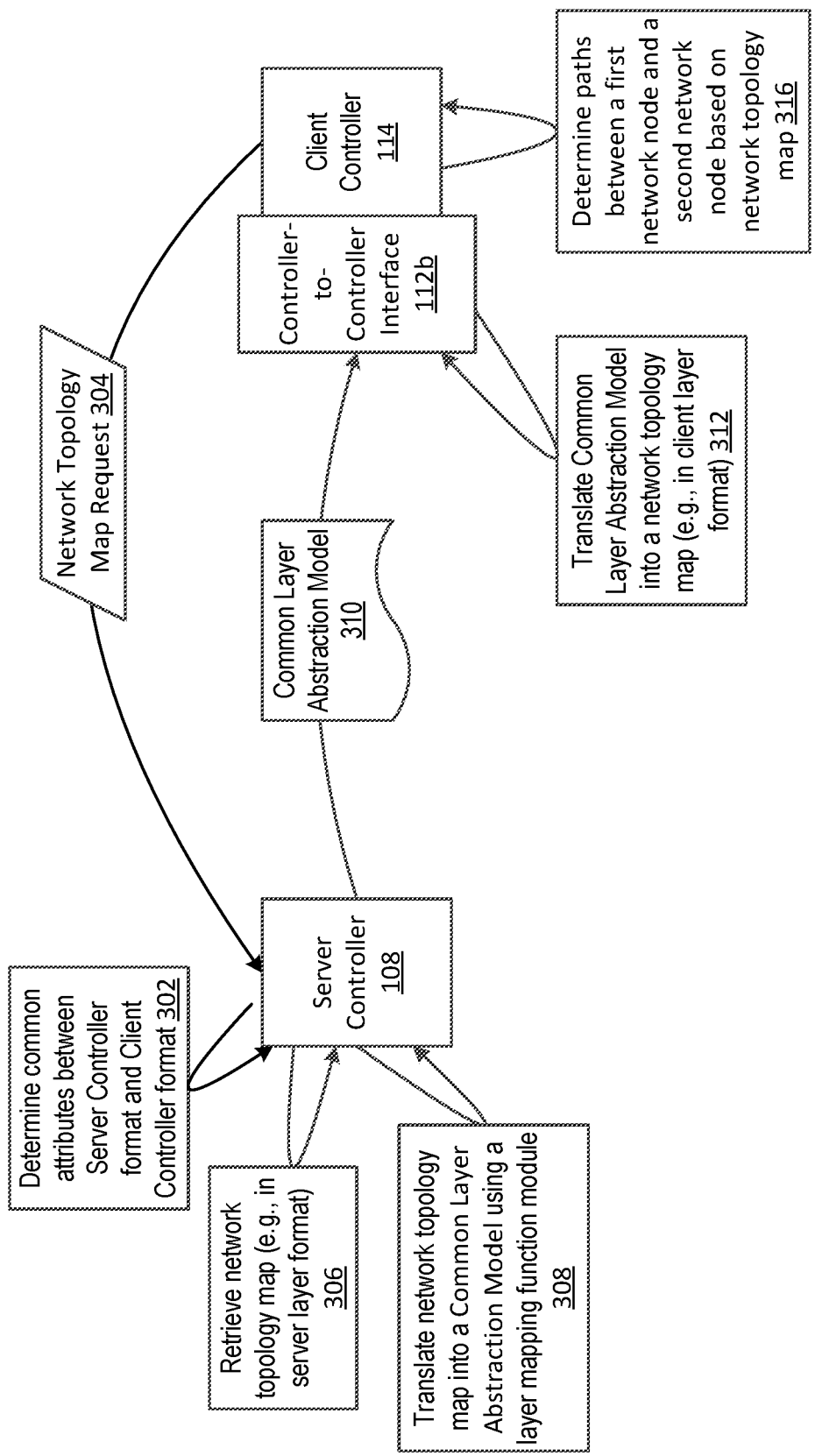
FIG. 3 is a flow diagram of providing a network topology map to a Client controller with a controller-to-controller interface from a Server controller, according to a second embodiment.

FIG. 3 is a flow diagram of providing a network topology map to a Client controller 114 operatively coupled to a controller-to-controller interface 112b, from a Server controller 108, according to a second embodiment. Similar to the process shown in FIG. 2, the Server controller 108 can use a LMF module 110 (e.g., shown in FIG. 1) to determine common attributes, at 302, between the layer formats of the Server controller 108 and the Client controller 114. The Server controller can also retrieve, at 306, the network topology map in the optical layer format, and the LMF module 110 can use the retrieved network topology map to translate, at 308, the network topology map into a CAM 310. In some implementations, the Server controller 108 can send the CAM 310 to the controller-to-controller interface 112b, e.g., via a signal to the controller-to-controller interface 112b including a representation of the CAM 310. The controller-to-controller interface 112b can then translate, at 312, the CAM 310 into a network topology map, e.g., in an IP layer format. The Client controller 114 can then use the network topology map in the IP layer format to determine, at 316, paths between a first network node in the network and a second network node in the network.

In some implementations, the Client controller 114 can directly receive the CAM 310, instead of receiving the translated network topology map from the controller-to-controller interface 112b. The Client controller 114 can be configured to interpret the CAM 310 directly, e.g., to update a network topology map stored at the Client controller 114, in place of a network topology map in an IP layer format, and/or the like. In some implementations the Client controller 114 can also translate the CAM 310 into a network topology map, e.g., to store and/or process at the Client controller 114.

Figure 4:
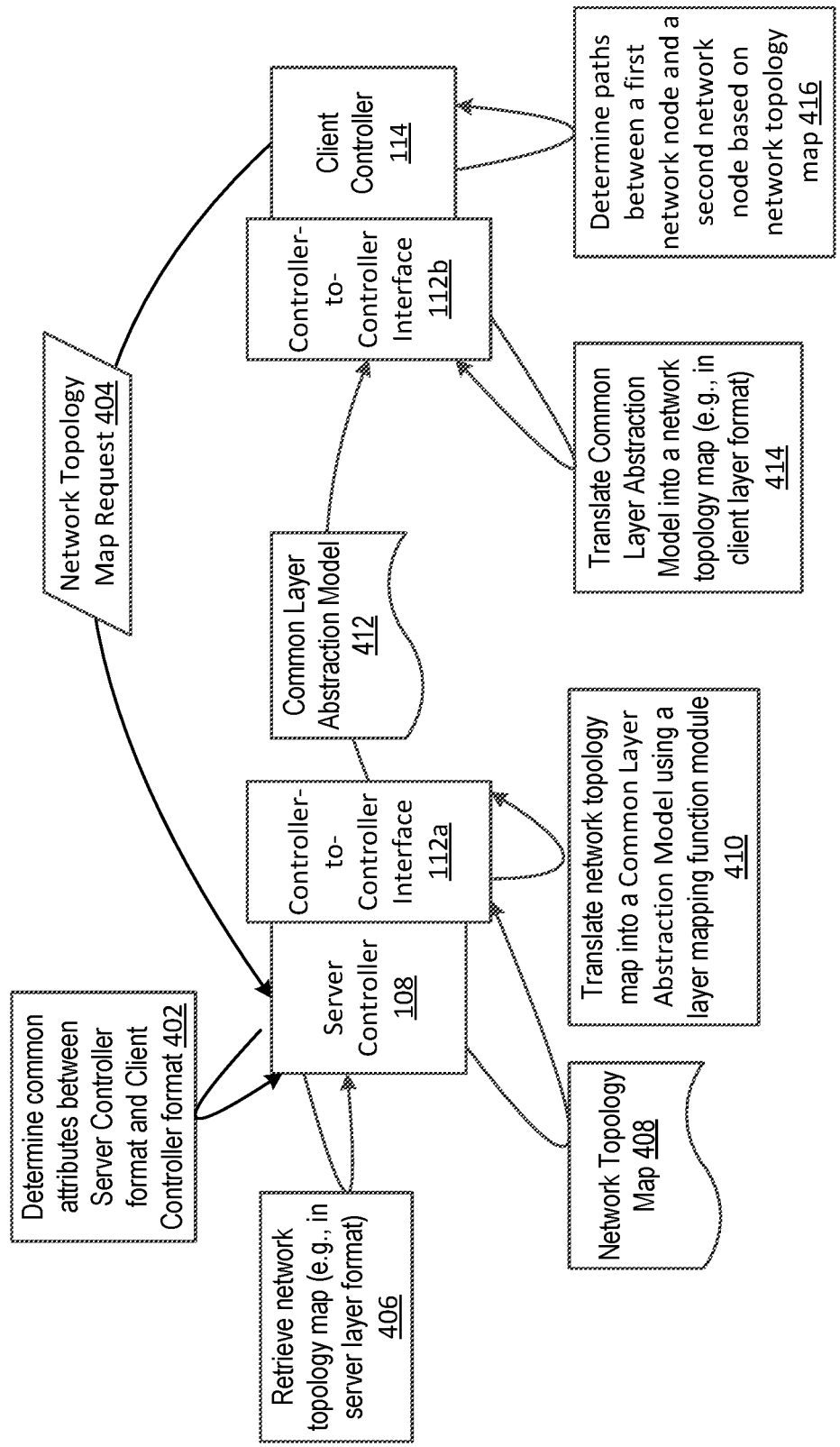
FIG. 4 is a flow diagram of providing a network topology map to a Client controller with a controller-to-controller interface from a Server controller with a controller-to-controller interface, according to a third embodiment.

FIG. 4 is a flow diagram of providing a network topology map to an Client controller 114 with a controller-to-controller interface 112b from an Server controller 108 with a controller-to-controller interface 112a, according to a third embodiment. In some implementations, multiple controllers in the multi-layer network can be operatively coupled to a given controller-to-controller interface configured to translate and/or process network topology maps for the particular controller(s) to which it is attached. The controller-to-controller interfaces can also be operatively coupled to a LMF module (not shown in FIG. 4), e.g., instead of a controller being operatively coupled to a LMF controller. For example, similar to the process in FIG. 2, the Server controller 108 can determine, at 402, common attributes between the optical layer format and the IP layer format. The Server controller 108 can retrieve, at 406, its representation of the network topology map 408 (e.g., in the optical layer format), and can provide the network topology map 408 to the controller-to-controller interface 112a.

The controller-to-controller interface 112a can translate, at 410, the network topology map 408 into a CAM 412 of the network topology map, e.g., via the LMF module operatively coupled to the controller-to-controller interface 112a. The controller-to-controller interface 112a can send the CAM 412 to the controller-to-controller interface 112b operatively coupled to the Client controller 114. The controller-to-controller interface 112b can translate, at 414, the CAM 412 into a network topology map, e.g., in an IP layer format, and can provide the translated network topology map to the Client controller 114. Alternatively, the controller-to-controller interface 112b can provide the Client controller 114 with the CAM directly. The Client controller 114 can then determine, at 416, paths between a first network node in the network and a second network node in the network.

Figure 5:
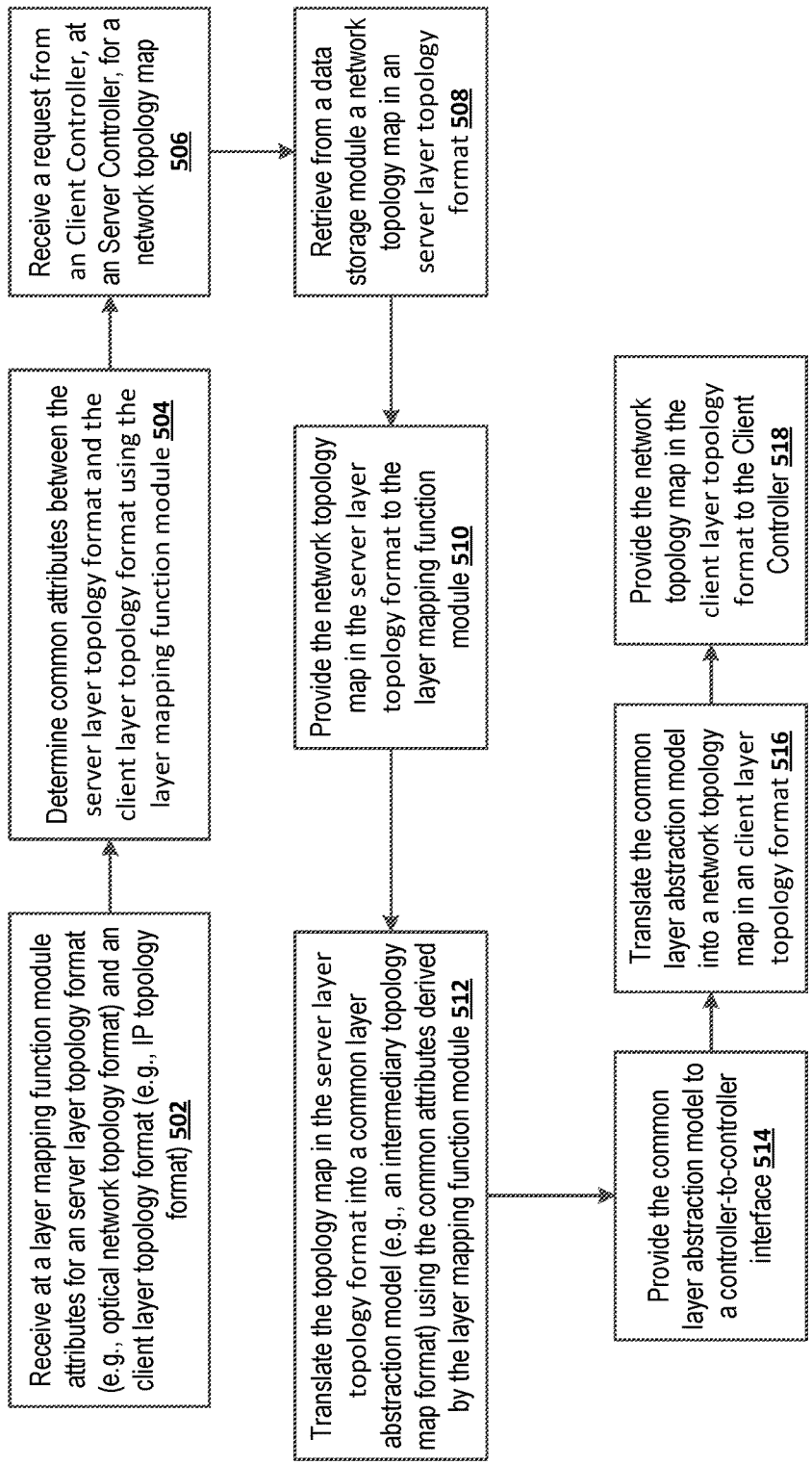
FIG. 5 is a flow diagram of providing a network topology map to a Client controller from a Server controller with a controller-to-controller interface, according to an embodiment.

FIG. 5 is a flow diagram of providing a network topology map to a Client controller from a Server controller with a controller-to-controller interface, according to an embodiment. In some implementations, a Server controller 108 can receive (e.g., at a LMF module 110, and/or directly at the Server controller 108) attributes and/or descriptions relating to an optical layer's network topology format, as well as attributes and/or descriptions relating to an IP layer's network topology format, at 502. The LMF module 110 can determine common attributes and/or indicia between the optical layer's and the IP layer's network topology formats, at 504, which can be used later to generate a CAM of the network topology map.

The Server controller 108 can receive a request from a Client controller 114 for a network topology map, at 506, and can retrieve, in response to the request, a network topology map in an optical layer format, at 508. The Server controller 108 can provide, at 510, the network topology map to the LMF module 110. The LMF module 110 translates, at 512, the network topology map in the optical layer format into a CAM representing the network topology map, e.g., based on the common attributes derived by the LMF module 110. The CAM can be an intermediary network topology map format, which can abstract the layer-specific details of the network topology map stored at the Server controller 108, and can be used to translate the network topology map into other layer formats, and/or to interpret the network topology map at other network layers.

The LMF 110 can provide, at 514, the CAM to a controller-to-controller interface 112a operatively coupled to the Server controller 108. The controller-to-controller interface 112a can be configured to translate the common layer abstraction model into a network topology map in an IP layer format, at 516. The network topology map in an IP layer and/or other client layer topology format can then be provided, at 518, to the Client controller 114 for processing (e.g., to determine how to route data packets, and/or the like). Alternatively, the controller-to-controller interface 112a can send the CAM directly to the Client controller 114, without translating it into an IP layer format, and the Client controller 114 can directly interpret the CAM to determine paths between network nodes.

Figure 6:
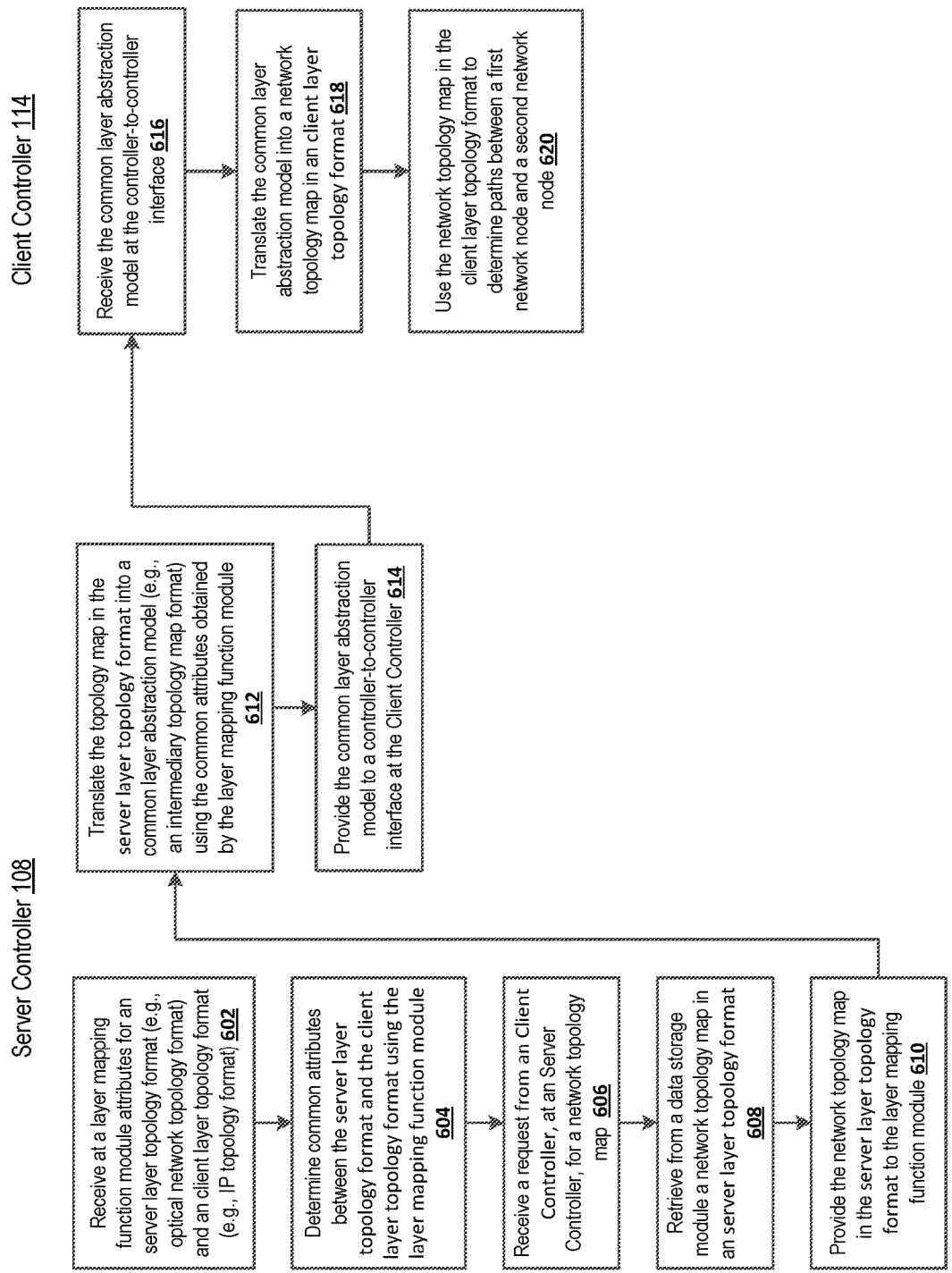
FIG. 6 is a flow diagram of providing a network topology map to a Client controller with a controller-to-controller interface from a Server controller, according to an embodiment.

FIG. 6 is a flow diagram of providing a network topology map to a Client controller 114 operatively coupled to a controller-to-controller interface, from a Server controller 108, according to an embodiment. In some implementations, a Server controller 108 can receive (e.g., at a LMF module 110, and/or directly at the Server controller 108) attributes and/or descriptions relating to an optical layer's network topology format, as well as attributes and/or descriptions relating to an IP layer's network topology format, at 602. The LMF module 110 can determine common attributes and/or indicia between the optical layer's and the IP layer's network topology formats, at 604, which can be used later to generate a CAM of the network topology map.

The Server controller 108 can receive a request from a Client controller 114 for a network topology map, at 606, and can retrieve, in response to the request, a network topology map in an optical layer format at 608. The Server controller 108 can provide, at 610, the network topology map to the LMF module 110, the LMF module 110 being configured to translate, at 612, the network topology map in the optical layer format into a CAM representing the network topology map, e.g., based on the common attributes derived by the LMF module 110. The LMF module 110 can be configured to provide, at 614, the CAM to a controller-to-controller interface 112b at the Client controller 114. The controller-to-controller interface 112b at the Client controller 114 receives the CAM, at 616, and translates the CAM into a network topology map, at 618, in an IP layer and/or other client layer topology format. The network topology map in the IP layer format can then be used by the Client controller to determine paths between a first network node in the network and a second network node in the network, at 620. In some implementations, the controller-to-controller interface 112b can provide the CAM directly to the Client controller for processing.

While embodiments herein relate to communications between an optical layer of a multi-layer network and a client layer of a multi-layer network, it should be understood that the embodiments can also be used with controllers on other layers of the multi-layer network.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A system, comprising:
a first controller configured to be coupled at a first layer of a multilayer network including a processor configured to translate a first network topology map in a first format and at the first layer of the multilayer network into a common link abstraction model (CAM) in response to a network topology map request from a second controller configured to be coupled at a second layer of the multilayer network, the CAM describing connections between network nodes from a plurality of network nodes that are operatively connected to (1) the first controller and (2) the second controller through the first controller such that the first controller is connected between the plurality of network nodes and the second controller, the connections being independent of a topology of the first layer of the multilayer network, the CAM configured to abstract data (1) associated with the first layer and (2) of the first network topology map and specify information generated from the first network topology map and relating to common attributes between an abstraction of the first format and an abstraction of a second format, the first network topology map being stored at the first controller in an optical layer format, the first controller configured to provide the CAM to a controller-to-controller interface, the controller-to-controller interface coupled to the second controller at the second layer, the controller-to-controller interface configured to convert the CAM into a second network topology map in the second format and provide the second network topology map to the second controller configured to (1) determine a fastest path between a first network node included in the plurality of network nodes and a second network node included in the plurality of network nodes based on the second network topology map and (2) generate virtual network nodes to perform network functions, based on the second network topology map, the second controller configured to not interpret the CAM.

2. The system of claim 1, wherein:
the first layer is a server layer of the multilayer network, and the server layer is configured to use an optical domain protocol.

3. The system of claim 1, wherein:
the second layer is a client layer of the multilayer network, and
the client layer is configured to use an internet protocol (IP) domain protocol.

4. The system of claim 1, wherein:
the first format is an optical network topology format; and
the second format is an internet protocol (IP) topology format.

5. The system of claim 1, wherein:
the first format is an optical network topology format,
the second format is an internet protocol (IP) topology format, and
the processor is configured to determine common attributes between the optical network topology format and the IP topology format.

6. The system of claim 1, wherein:
the first format is an optical network topology format,
the second format is an internet protocol (IP) topology format, and
the CAM is configured to describe the first network topology map using common attributes between an abstraction of the optical network topology format and an abstraction of the IP topology format.

7. A method, comprising:
receiving a signal at a first controller at a first layer of a multilayer network from a second controller at a second layer in the multilayer network, the signal requesting a second network topology map in a second layer topology format, a first network topology map in a first layer topology format and being stored at a network entity at the first layer in an optical layer format;
in response to the signal, retrieving the first network topology map at the first controller;
translating the first network topology map into a common link abstraction model (CAM) using a processor at the first controller, the CAM describing connections between network nodes from a plurality of network nodes that are operatively connected to (1) the first controller and (2) the second controller through the first controller such that the first controller is connected between the plurality of network nodes and the second controller, the connections being independent of a topology of the first layer of the multilayer network, the CAM configured to abstract data (1) associated with the first layer and (2) of the first network topology map and specify information generated from the first network topology map and relating to common attributes between an abstraction of the first layer topology format and an abstraction of the second layer topology format; and sending, by the first controller, the CAM to a controller-to-controller interface, the controller-to-controller interface (1) coupled to the second controller and (2) configured to translate the CAM into the second network topology map and send the second network topology map to the second controller such that the second controller (1) determines at least one of a shortest path or a fastest path between a first network node included in the plurality of network nodes and a second network node included in the plurality of network nodes based on the second network topology map and (2) generates virtual network nodes to fulfill network functions, the second controller not configured to interpret the CAM.

8. The method of claim 7, wherein:
the first layer is a client layer of the multilayer network, and
the client layer uses an internet protocol (IP) domain protocol.

9. The method of claim 7, wherein:
the second layer is a server layer of the multilayer network, and
the server layer uses an optical domain protocol.

10. The method of claim 7, wherein the network entity interprets the first network topology map using optimizations inherent to the optical layer format.

11. The method of claim 7, wherein the first network topology map includes attributes specific to the first layer in the optical layer format.

12. The method of claim 7, wherein the common attributes include common indicia within the first layer topology format and the second layer topology format, the common indicia indicative of: (1) a network link in at least one of the first network topology map or the second network topology map, (2) a path between network nodes represented within at least one of the first network topology map or the second network topology map, and (3) a network node represented within at least one of the first network topology map or the second network topology map.

13. A non-transitory, processor-readable medium storing instructions that when executed by a processor, cause the processor to:
receive a signal at a first controller at a first layer of a multilayer network from a second controller at a second layer in the multilayer network, the signal requesting a second network topology map in a second layer topology format, a first network topology map in a first layer topology format and being stored at a network entity at the first layer in an optical layer format;
in response to the signal, retrieve the first network topology map at the first controller;
translate the first network topology map into a common link abstraction model (CAM) using the processor at the first controller, the CAM describing connections between network nodes from a plurality of network nodes that are operatively connected to (1) the first controller and (2) the second controller through the first controller such that the first controller is connected between the plurality of network nodes and the second controller, the connections being independent of a topology of the first layer of the multilayer network, the CAM configured to abstract data (1) associated with the first layer and (2) of the first network topology map and specify information generated from the first network topology map and relating to common attributes between an abstraction of the first layer topology format and an abstraction of the second layer topology format; and send, by the first controller, the CAM to a controller-to-controller interface, the controller-to-controller interface (1) coupled to the second controller and (2) configured to translate the CAM into the second network topology map and send the second network topology map to the second controller such that the second controller (1) determines at least one of a shortest path or a fastest path between a first network node included in the plurality of network nodes and a second network node included in the plurality of network nodes based on the second network topology map and (2) generates virtual network nodes to fulfill network functions, the second controller not configured to interpret the CAM.

14. The non-transitory, processor-readable medium of claim 13, wherein:

the first layer is a client layer of the multilayer network, and the client layer uses an internet protocol (IP) domain protocol.

15. The non-transitory, processor-readable medium of claim 13, wherein:

the second layer is a server layer of the multilayer network, and the server layer uses an optical domain protocol.

16. The non-transitory, processor-readable medium of claim 13, wherein the network entity interprets the first network topology map using optimizations inherent to the optical layer format.

17. The non-transitory, processor-readable medium of claim 13, wherein the first network topology map includes attributes specific to the first layer in the optical layer format.

18. The non-transitory, processor-readable medium of claim 13, wherein the common attributes include common indicia within the first layer topology format and the second layer topology format, the common indicia indicative of: (1) a network link in at least one of the first network topology map or the second network topology map, (2) a path between network nodes represented within at least one of the first network topology map or the second network topology map, and (3) a network node represented within at least one of the first network topology map or the second network topology map.

19. The non-transitory, processor-readable medium of claim 13, wherein the second controller determines the shortest path and the fastest path between the first network node and the second network node.

* * * * *